(12) United States Patent
Sedivy et al.

(10) Patent No.: US 11,707,054 B2
(45) Date of Patent: Jul. 25, 2023

(54) DEVICE FOR THE NESTING OF SOLITARY BEES

(71) Applicant: Wildbiene + Partner AG, Zurich (CH)

(72) Inventors: Claudio Sedivy, Zurich (CH); Florian Schröder, Zurich (CH)

(73) Assignee: WILDBIENE + PARTNER AG, Zurich (CH)

( * ) Notice: Subject to any disclaimer, the term of this patent is extended or adjusted under 35 U.S.C. 154(b) by 173 days.

(21) Appl. No.: 17/281,306

(22) PCT Filed: Sep. 2, 2019

(86) PCT No.: PCT/IB2019/057384
§ 371 (c)(1),
(2) Date: Mar. 30, 2021

(87) PCT Pub. No.: WO2020/070566
PCT Pub. Date: Apr. 9, 2020

(65) Prior Publication Data
US 2021/0400923 A1 Dec. 30, 2021

(30) Foreign Application Priority Data
Oct. 3, 2018 (CH) ........................................ 1208/18

(51) Int. Cl.
*A01K 47/00* (2006.01)
(52) U.S. Cl.
CPC .................... *A01K 47/00* (2013.01)
(58) Field of Classification Search
CPC ......... A01K 47/00; A01K 49/00; A01K 57/00
See application file for complete search history.

(56) References Cited

U.S. PATENT DOCUMENTS

| 3,267,497 | A | * | 8/1966 | Dority | A01K 49/00 449/4 |
| 4,628,558 | A | * | 12/1986 | Pederson | A01K 47/00 6/1 |
| 6,364,738 | B1 | | 4/2002 | Kendell et al. | |
| D666,780 | S | | 9/2012 | Novich et al. | |

(Continued)

OTHER PUBLICATIONS

International Search Report for PCT/IB2019/057384 dated Nov. 14, 2019.
Written Opinion for PCT/IB2019/057384 dated Nov. 14, 2019.

*Primary Examiner* — Joshua J Michener
*Assistant Examiner* — Henry Hooper Mudd
(74) *Attorney, Agent, or Firm* — Pearne & Gordon LLP (57) ABSTRACT

A board which can be used to form a beehive for solitary bees and/or wasps, the board including a first surface and a second surface which is opposite to the first surface, wherein the first surface having a plurality of holes defined therein, wherein the board further includes a plurality of individual tube members which project from the second surface and wherein each tube member is aligned with a respective hole defined in the first surface so that a bee can pass via a hole into the tube member which is aligned with the hole and wherein the plurality of tube members are arranged such that there are voids between adjacent tube members. There is further provided a device (beehive) which includes a plurality of the boards; and a method of forming a device (beehive) which includes a plurality of the boards.

15 Claims, 6 Drawing Sheets

(56) References Cited

U.S. PATENT DOCUMENTS 8,465,340 B1 6/2013 Allan
2013/0005216 A1\* 1/2013 Rittberger .............. A01K 47/00
449/13

\* cited by examiner

DEVICE FOR THE NESTING OF SOLITARY BEES

FIELD OF THE INVENTION

The present invention concerns a device for the nesting of solitary bees or wasps, and a method for manufacturing a device for the nesting of solitary bees or wasps.

DESCRIPTION OF RELATED ART

Bees are often solely associated with honey provided from nectar and pollen by colonies of bees living in a beehive ruled by a queen to ensure an optimal honey production. This is the role of honeybees (*Apis spec.*).

Solitary bees (also called native bees) represent another group of bees that do not produce honey or wax nor live in a colony with a queen.

Mason bees (genus *Osmia*) are a group of native bee species, some of which are quite common in Central Europe. They are usually smaller than a honeybee, and typically metallic blue or black in color. They get their name from their habit of nest-building, which is to seal off the cells where they lay their eggs with a mortar-like application of mud or masticated leaf material.

In the wild, mason bees lay their eggs in small natural cavities such as beetle grub burrows in dead wood or hollow plant stems. Female mason bees emerge in early spring and immediately begin to search for pollen and nectar, thus pollinating thousands of flowers, which they collect from many different plant species such as fruit trees. The collected food is packed into the far end of their nesting cavity until there's enough there to feed a young bee. The female lays an egg and seals up the cell with said mud wall, thus completing a brood cell. This process continues until the bee has filled the entire cavity with a series of brood cells, thus forming a nest. The bee completes the nest by sealing the entrance of the cavity with a thick mud plug. She then begins filling another cavity. This pollen-collecting and egg-laying continues for four to six weeks, after which the bee dies.

Mason bee larvae hatch just a few days after the eggs are laid. They feed on the food that has been stored in their brood cell, which usually takes about 20-30 days. Once the food storage is fully consumed, the larva spins a cocoon and pupates. Metamorphosis occurs in summer and by early autumn, the bees have fully developed into imagines (adult bees). They remain in a state of hibernation inside their cocoons throughout the winter. When temperatures rise in spring, the males hath few days before the females; right after mating, the females of the new generation initiate another cycle.

Solitary bees are among the most important contributors to pollination and play an essential role in crop pollination, i.e. of fruit trees. Unfortunately, populations of solitary bees, just like honeybee populations, dropped dramatically over the past decades. This decrease is due to the excessive use of pesticides, intensification of agricultural practices and increased urbanization resulting in a dramatic loss of habitat.

In order to achieve optimal pollination of fruit trees, mason bees are artificially introduced into orchards along with suitable nesting stands. The cocoons of these managed mason bees need to be removed from their nesting cavities each year to provide for a removal of parasites and to manage the wintering and hatching time for optimal application in the orchards. Therefore, the nesting material needs to provide attractive nesting cavities on the one hand, and must be easily opened to access the cocoons for manipulation and parasite removal.

The document U.S. Pat. No. 8,465,340 describes an existing nesting structure for solitary bees. The nesting structure has a cubic shape formed by several square nest elements superimposed on top on another. The nesting structure comprises an alternate of a first nesting structure and second nesting structure:
- the first nesting structure comprises longitudinal grooves accommodated within the main surface of the nest element from one side to the opposite side;
- the second nest structure does not have grooves and closes the grooves of the first structure when superimposed on said first structure;

However, with the device of U.S. Pat. No. 8,465,340, the depth of the cavity is defined by the length of the longitudinal groove that extend over the entire length of the main surface of the nest element, in other words, the length of the tubular cavity is constant. It is not possible to modulate the length of the tubular cavity, for instance depending on the space available where the nest structure is placed. Furthermore, inevitably occurring grooves along the cavities of said existing nesting material are recognized by the bees and considered a factor strongly decreasing attractivity of the cavity as a nesting site.

Therefore, there is a need to provide an alternative solution for a nesting device minimizing the drawbacks of the existing solutions.

BRIEF SUMMARY OF THE INVENTION

According to the invention, there is provided a board which can be used to form a beehive for solitary bees and/or wasps, the board comprising a first surface and a second surface which is opposite to the first surface; wherein the first surface having a plurality of holes defined therein; wherein the board further comprises a plurality of individual tube members which project from the second surface and wherein each tube member is aligned with a respective hole defined in the first surface so that a bee can pass via a hole into the tube member which is aligned with said hole; and wherein the plurality of tube members are arranged such that there is voids between adjacent tube members.

A plurality of said afore-mentioned boards can be stacked to form a beehive (referred to hereafter as a "device"), for the nesting of solitary bees and/or wasps, the device comprising a plurality of tubular cavities arranged for being used by said solitary bees and wasps to build their nests and receiving offspring during the nesting period of the solitary bees or wasps.

The dependent claims describe, preferable, optional features of the board. The description of the drawings may also describe, preferable, optional features of the board. For example, in an embodiment of the board, in first surface of the board, around each of the respective holes there may be defined a respective grove, and wherein each respective grove is configured such that it can receive the second, free end of a respective tube member of another board.

According to a further aspect of the present invention there is provided a device for the nesting of solitary bees and wasps, the device comprising a plurality of tubular cavities arranged for being used by said solitary bees and wasps to build their nests in the nesting cavities for receiving offspring during the nesting period of said solitary bees or wasps, wherein the device comprises a stack formed by a plurality of boards according to the afore-mentioned board, said stacks comprising at least an entry board and an exit board, the stack comprising at least a first board which is arranged so that the second, free ends of the respective tube members of the first board abut the first surface of a second, adjacent, board, so that the respective tube members of the first board are aligned with the holes defined in the first surface of a second, adjacent, board, such that the tubes of the first and second boards form extended tubular cavities which extend from the entry board to the exit board.

The dependent claims describe, preferable, optional features of the device. The description of the drawings may also describe, preferable, optional features of the device.

In one embodiment, the stack is vertically laminated so that the first surface and the second surface of the boards of the stack are arranged to extend in the direction of gravity. In this embodiment, the tubular cavities extend in a direction perpendicular to the direction of gravity.

Figure 1:
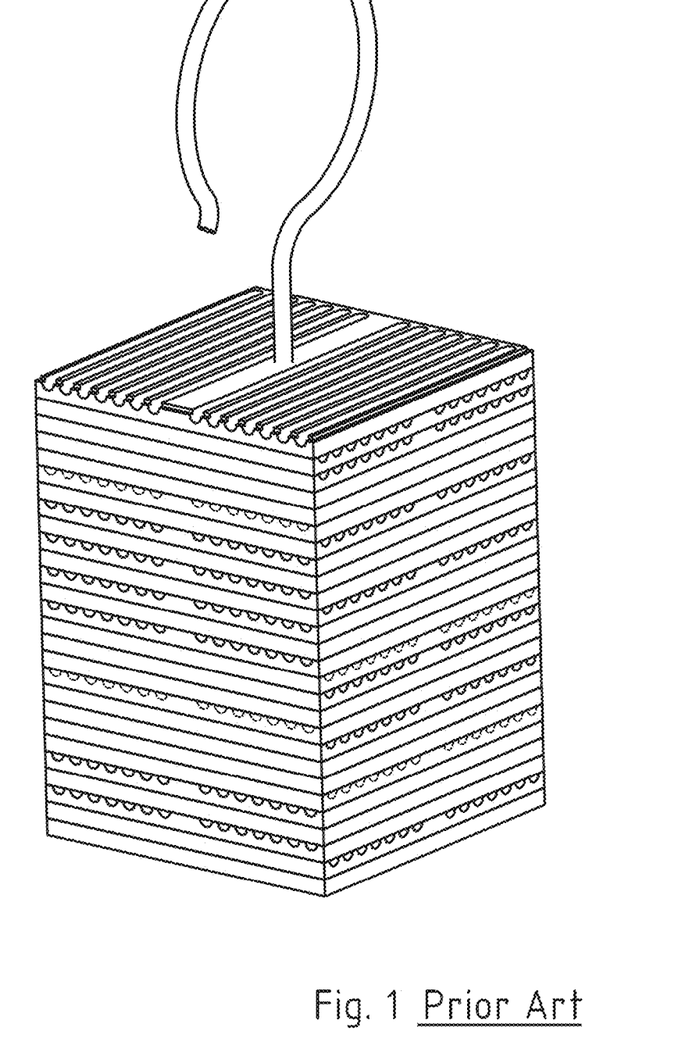
FIG. 1 shows a general view of a device according to the prior art.

In one embodiment, the stack is horizontally laminated so that the first surface and the second surface of the boards of the stack are arranged to extend perpendicular to the direction of the gravity. In this embodiment, the tubular cavities extend in the direction of gravity. Either vertically or horizontally disposed after assembly, the tubular cavities will be formed by the series of aligned tube members when the boards are stacked. By arranging at least a first board so that the second, free ends of the respective tube members of the first board abut the first surface of a second, adjacent, board, so that the respective tube members of the first board are aligned with the holes defined in the first surface of the second, adjacent, board, the tubes of the first and second boards form extended tubular cavities. Preferably the second, free ends of the respective tube members of the first board abut respective grooves defined around respective holes defined in the first surface of a second, adjacent, board. The shape of the surfaces which abut is such that the connection between each section forming the tubular cavity is sealed to create a continuous and homogenous inner wall within the tubular cavities. Most preferably the shape of each respective groove defined around respective holes defined in the first surface of a second, adjacent, board, corresponds to the shape of second, free ends of the respective tube members of the first board, so that when the first and second boards are positioned so that the free ends of the respective tube members of the first board abut respective grooves defined around respective holes defined in the first surface of a second, adjacent, board, then the abutment between the free ends of the respective tube members of the first board and the respective grooves defined around respective holes defined in the first surface of a second, adjacent, board is a sealed abutment, to create respective continuous and homogenous inner wall within the tubular cavities. In other words, in the stack the tubular cavity is sliced into cross sections, each section corresponding to a tubular member in a board, whereas in the prior art represented in FIG. 1 the cavity is formed by two longitudinally connected semi-cylinders, one on each adjacent board. Therefore, with the present invention, the user can adjust the depth of the tubular cavity depending on the number of boards which are stacked. This is not possible with the existing device represented in FIG. 1.

The tubular cavity can have either a circular, hexagonal, U-shaped or any other profile that approximates a circular profile. In other words the tubular members which extend from the second surface of the board, may have a cross section which is circular, hexagonal, U-shaped or any other profile that approximates a circular profile.

Each cavity is an enclosed space comprising only two openings, a first opening towards the first main face of the entry board and a second opening toward the second main face of the exit board.

In one embodiment, the second surface of the exit board is covered by a back wall, thus sealing off one opening of each tubular cavity leaving only one opening towards the first main face of the entry board.

In one embodiment, the holes in the first surface of each board are distributed homogenously thus allowing for a maximization of the number of traversing holes on the board. In one embodiment, the tubular members which extend from the second surface of each board are distributed homogenously thus allowing for a maximization of the number of tubular members on the board. In other words, the number of tubular cavities in the device/beehive can be optimized.

In one embodiment, the distribution of the holes and/or tubular members on the boards is identical in all the boards of the stack. Thus, each board in the stack possesses the same shape, allowing for an efficient manufacturing process where only one kind of board has to be produced. By stacking the identical boards, the tubular members align to form continuous tubular cavities in which the solitary bees and wasps to build their nests.

In one embodiment, the diameter of the holes range between 7 and 9 mm, thus making the cavities, among others, most attractive to mason bees of the genus *Osmia*. In one embodiment, the diameter of each of the tubular members which extend from the second surface of the board range between 7 and 9 mm, thus making the cavities, among others, most attractive to mason bees of the genus *Osmia*.

In one embodiment, the stack further comprises at least one intermediary board between the entry board and the exit board. This allows forming a variable height of the resulting stack and controlling the total nesting cavity volume per stack available for bees to build their nests.

In one embodiment, the device further comprises attachment means to maintain the boards in abutment. For example to maintain a sealed connection between the groove around the holes on the first surface of the board and the free ends of the tubular members on the board of the adjacent board, in the stack, including the back wall covering the second main face of the exit board. For instance, attachment means may comprise threaded rods traversing the stack, fastened with nuts on each end.

In one embodiment, at least one board is made of a material chosen among polymers, for instance PVC or polypropylene (PP). The advantage is that these materials are inexpensive, water- and weatherproof.

In one embodiment, at least one board of the stack is die-casted, which is a cost effective and fast way to produce the boards in large numbers. This makes production of the boards fast and cost effective.

The device is reusable. In other words, the device can be washed and reused each year.

Advantageously, the device according to the present invention proves to be weatherproof, that is resistant against wetness, UV-radiation and wide ranges in temperatures.

The inventors also found out that the device according to the present invention offers a proven and highly attractive nesting device for solitary bees of the genus *Osmia*.

According to a further aspect of the present invention there is provided a method of forming a beehive for solitary bees and/or wasps (i.e. a method of forming the afore mentioned "device"), the method comprising the steps of: providing a plurality of the afore mentioned boards; and stacking the plurality of boards by arranging at least a first board so that the second, free ends of the respective tube members of the first board abut the first surface of a second, adjacent, board, so that the respective tube members of the first board are aligned with the holes defined in the first surface of the second, adjacent, board, such that the tubes of the first and second boards form extended tubular cavities.

The dependent claims describe, preferable, optional steps of the method. The description of the drawings may also describe, preferable, optional steps of the method.

In one embodiment of the method, the stack is a vertically laminated stack, so that in operation, the first surface and the second surface of the boards of the stack extend in a direction parallel to the direction of gravity.

In an embodiment of the method, the stack is a horizontally laminated stack, so that in operation, the first surface and the second surface of the boards of the stack extend in a direction perpendicular to the direction of the gravity.

In one embodiment of the method, the method further comprises a step of placing at least one intermediate board between the entry board and the exit board during the assembly step.

In one embodiment of the method, the method further comprises a step of attaching the boards of the stack with attachment means to maintain contact between the boards of the stack.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Examples of the invention are illustrated in FIGS. 2 to 6 that are described below. However, the invention is not limited to the disclosed examples.

Figure 2:
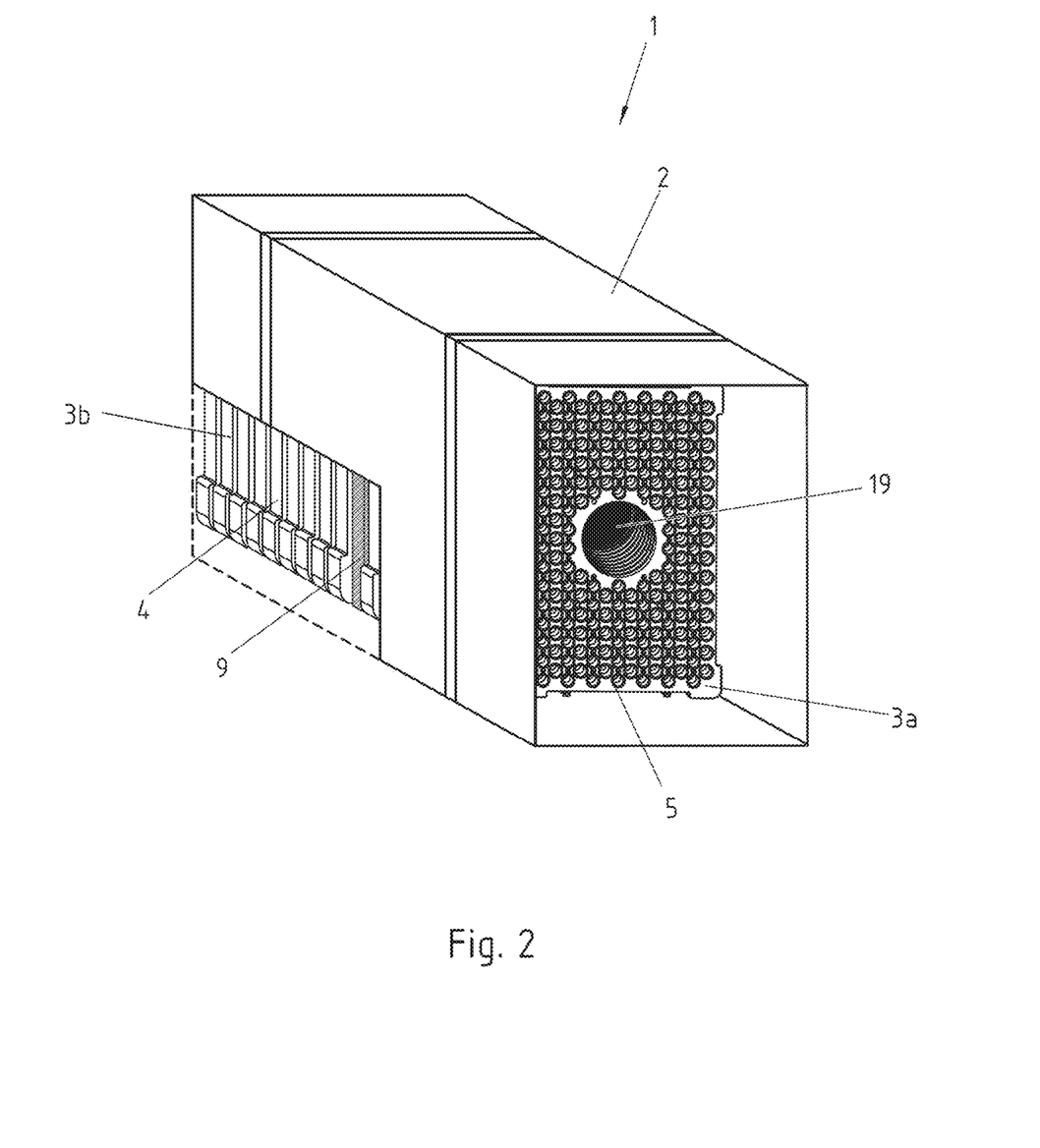
FIG. 2 shows a general view of a device according to a first embodiment.

FIG. 2 represents a device 1 according to a first embodiment of the invention. The device comprises a housing 2 with a rectangular shape that receives two opposite stacks 3a, 3b connected by a plate 9 forming the back wall for both stacks. When the housing 2 is in a horizontal position, with its longitudinal axis perpendicular to the direction of gravity, the stacks 3a, 3b are positioned back-to-back next to each other.

In the present embodiment, the stacks 3a, 3b are identical. In other embodiments (not represented in figures), the stacks can be different, for instance by comprising a different number of boards.

The housing 2 comprises two openings 5, each one exposing the entry board of one stack. The openings 5 provide an access for the bees to the stack 3a, 3b situated within the housing 2.

In the present embodiment, the stacks 3a, 3b are vertically laminated stacks, in other words, the boards 4 are radially stacked so that in operation their main faces are aligned with the direction of gravity. In the prior art represented in FIG. 1, the layers are on the contrary superimposed on top one another in a horizontally laminated stack, said layers being perpendicular to the direction of the gravity.

Figure 3:
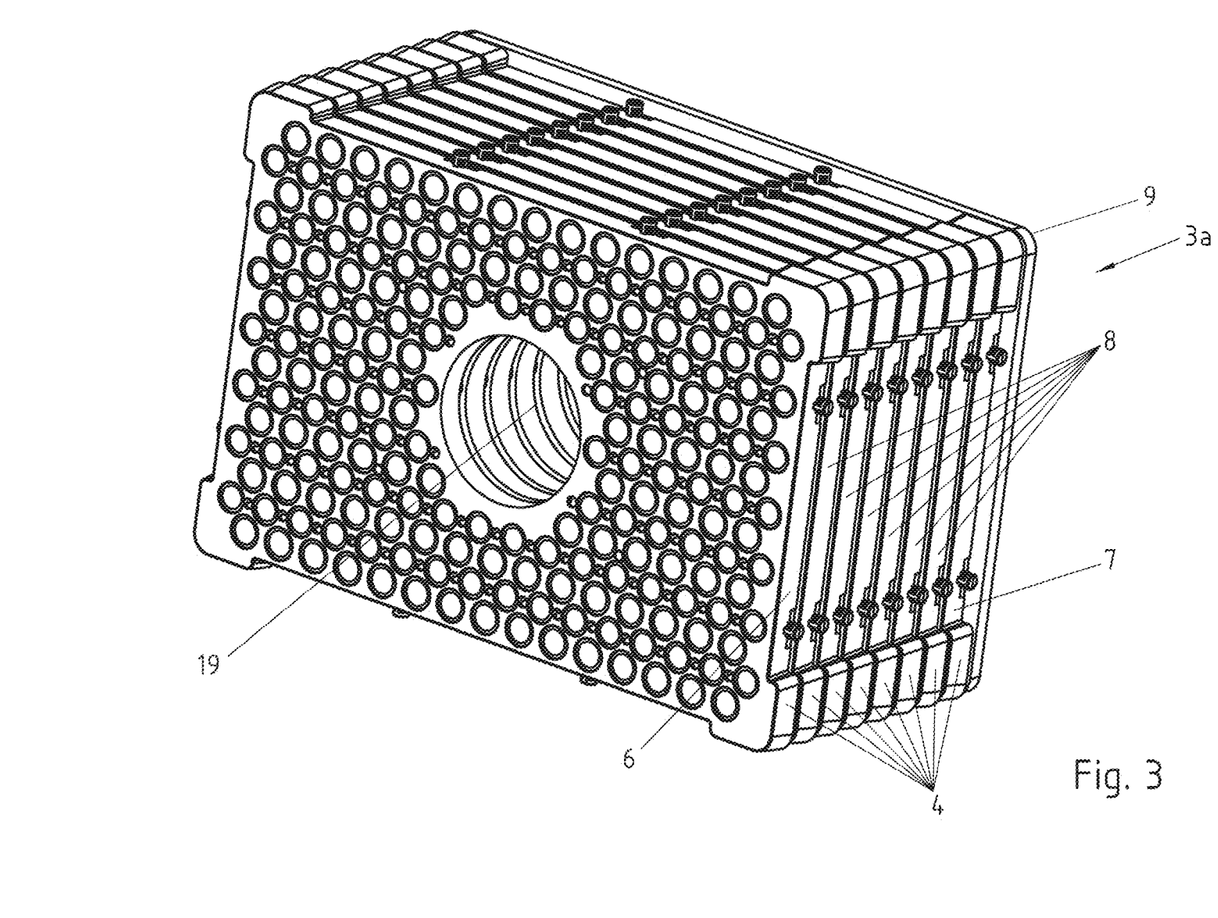
FIG. 3 shows a general view of a stack of the device according to the first embodiment.

FIG. 3 represents stack 3a. The stack 3a comprises an entry board 6, an exit board 7, and six intermediate boards 8 maintained between said entry board 6 and said exit board 7.

Figure 4:
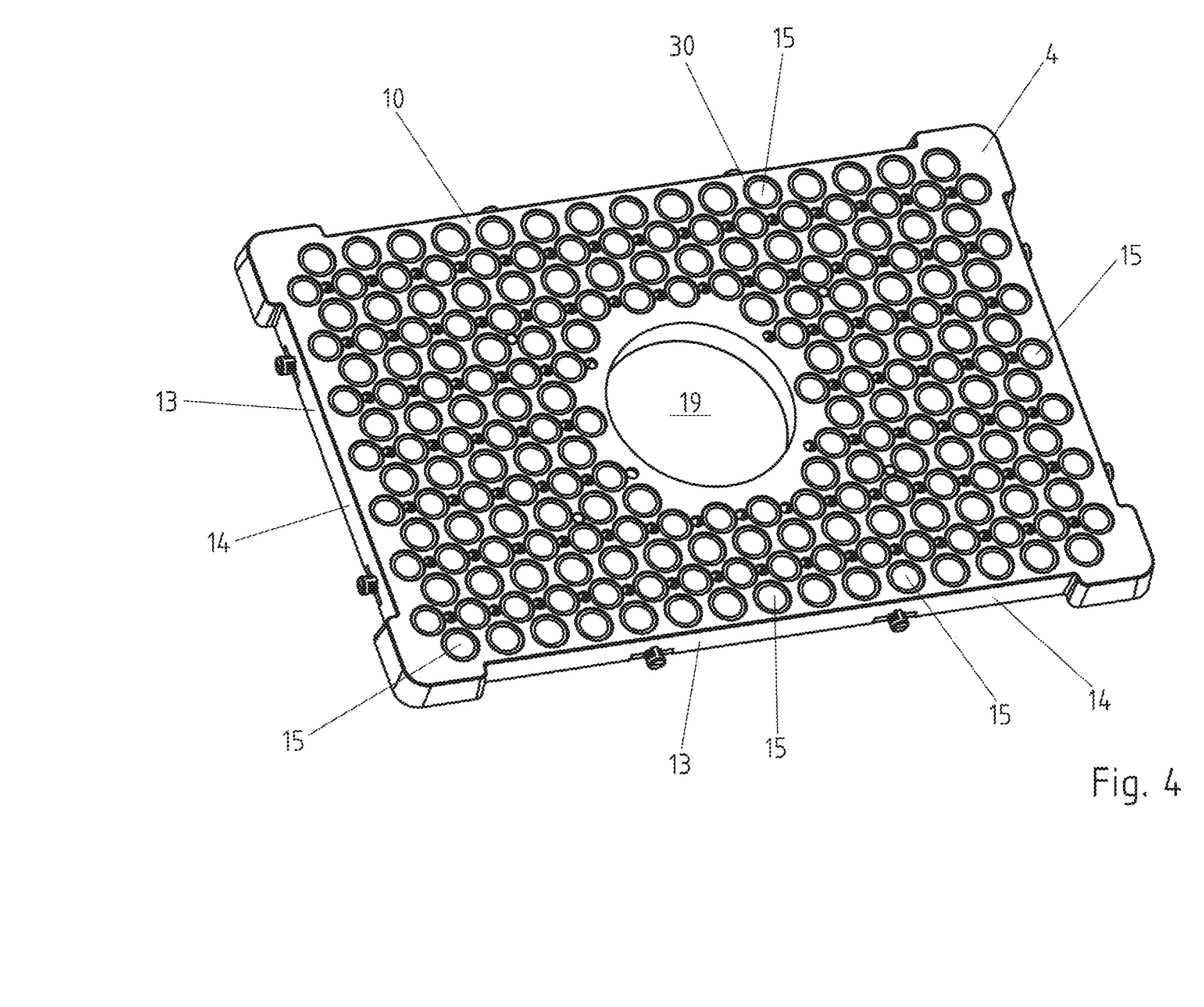
FIG. 4 shows a general view of the first main face of a board of the stack from FIG. 3.
Figure 5:
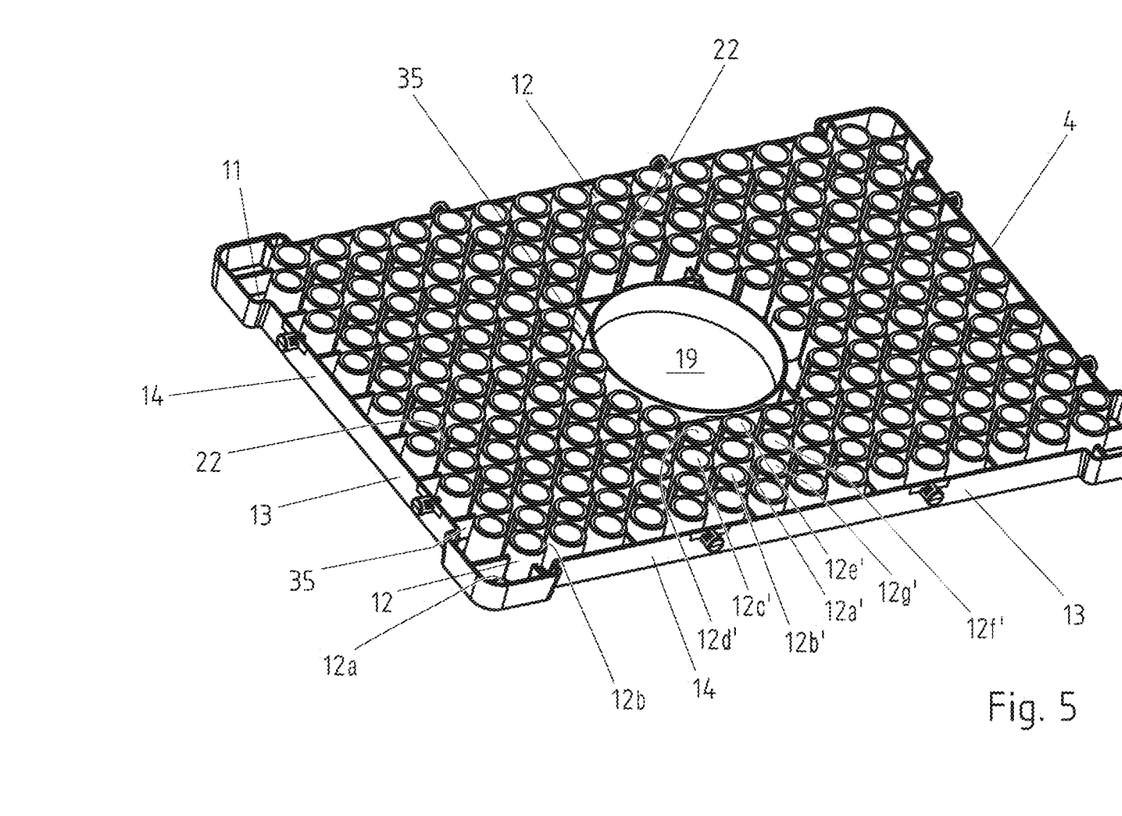
FIG. 5 shows a general view of the second main face of a board of the stack from FIG. 3.

As represented in FIGS. 4 and 5, the board 4 comprises a first surface 10 and a second surface 11 which is opposite to the first surface 10.

The first surface 10 of the board 4 has a plurality of holes 15 defined therein; the holes 15 are preferably homogenously distributed (in another embodiment the distribution of the holes 15 are heterogeneous (not represented in figures)). Most preferably the distribution of the holes (15) defined in the first surfaces of each board in the stack (3a, b) is identical on all the boards of the stack (3a;3b).

The board 4 further comprises a plurality of individual tube members 12 each of which project from the second surface 11. Each tube member 12 comprises a first end 12a which is attached to the second surface 11 and a second end 12b, which is a free end.

Each tube member 12 is aligned with a respective hole 15 defined in first surface 10. In other words, a hole 15 leads to inside the tube member 12 which is aligned with it. Accordingly, a bee can pass, via a hole 15 defined in first surface 10, into the tube member 12 which is aligned with that hole 15.

Figure 6:
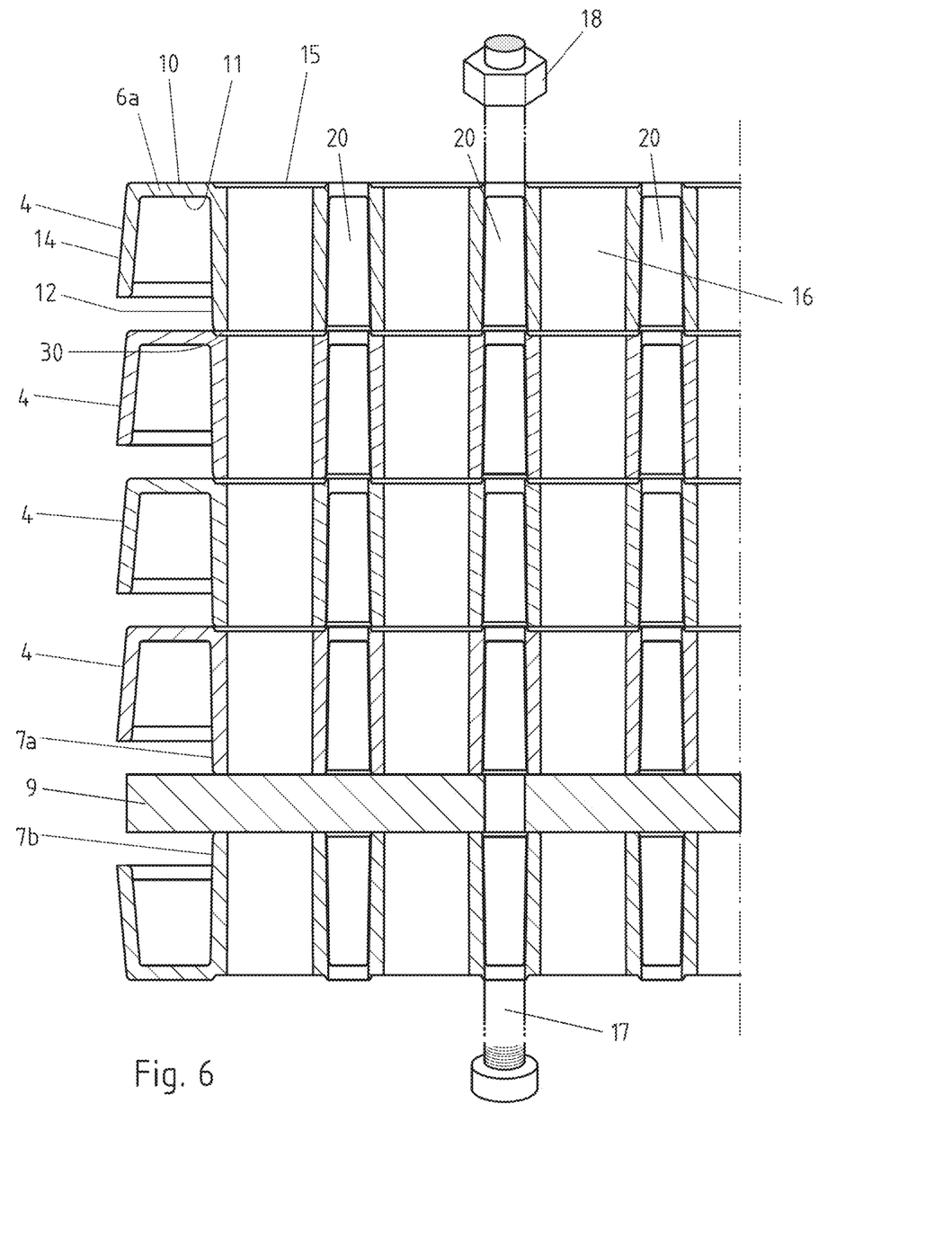
FIG. 6 shows a cross section view of a portion of the stack of FIG. 3.

Furthermore, in first surface 10 of the board 4, around each of the respective holes 15 there is defined a respective grove 30. Each respective grove 30 is configured such that it can receive the second, free end 12b of a respective tube member 12 of another board. Specifically, the dimensions (e.g. diameter and thickness) of each groove correspond to the dimensions of the second, free end 12b of the respective tube members 12. Since in a board each tube member 12 is aligned with a respective hole 15 defined in first surface 10 of that board, the position the groves 30 will correspond to the position of the tube members 12 of another board of the same type. Accordingly, as is shown in FIG. 6, when two or more boards 4 are stacked, the second, free end 12b of each of the respective tube member 12 of a board are received into respective grooves 30 defined in the first surface 10 of another board. The tube members 12 of each of the stacked boards thus align to form extended tubular cavities 16 in which the bees can nest.

Referring to FIG. 5, it can be seen that the plurality of tube members 12 are mechanically independent of one another; in other words for every tube member 12 there is a void 22 between that tube member 12 and each of the tube members 12 which are adjacent to it; for example, there is a void 22 between the tube member 12a' and each of the tube members 12b'-g' which are adjacent to the tube member 12a'. Air can freely flow in the voids 22 between the tube members 12; thus as can been seen the voids 22 between the plurality of tube members 12 collective define a network of air-channels which can serve to ventilate the beehive. Specifically, the voids 22 provide ventilation between the tube members 12 of a board 4, which ultimately serves to provide ventilation between boards 4 which are stacked to form a beehive for solitary bees and/or wasps.

The board 4 further comprises a flange which projects from the second surface 11, around a perimeter of the second surface 11. As shown in FIG. 5 the flange 14 has a substantially constant height 'h' above the second surface 11. Each of the plurality of tube members 12 project to a height 'H' above second surface 11 which is greater than the height 'h' of the flange 14; in other words the plurality of tube members 12 project to a greater height above second surface 11 than the flange 14. Thus when two or more boards 4 are stacked, and the second, free end 12b of each of the respective tube member 12 of a board are received into respective grooves 30 defined in the first surface 10 of another board, the flange 14 of the board does not abut the first surface 10 of said other board, thus allowing air to flow freely from an environment external to the beehive into network of air-channels defined by the tube members 12 which are between the stacked boards.

Additionally, as can be seen in FIG. 5, the board 4 further comprises one or more stabilization members 35. In this example the board 4 further comprises a plurality of stabilization members 35. Each stabilization member 35 projects from the second surface 11, and extends laterally from a portion of the flange 14 which defines one side of the board 4, to a portion of flange 14 which defined an opposite side of the board 4. The height above the second surface 11 to which each stabilization members 35 projects is less than the height 'H' above the second surface 11 to which the tube members 12 project to.

In stacks 3a, 3b the boards 4 are stacked by contacting the second, free end 12b of each of the respective tube member 12 of a board with respective grooves 30 defined in the first surface 10 of the adjacent board 4 as represented in FIG. 6. To facilitate understanding, FIG. 6 is a partial view of the stacks 3a and 3b and does not represent all the boards of the stacks 3a and 3b. Upon stacking, the tube members 12 of adjacent boards 4 align to define extended tubular cavities 16 in which bees can nest. In FIG. 6, four boards 4 are stacked (for illustration).

The stack 3a may further comprise a back wall 9 which is arranged to abut the second, free ends 12b of each of the respective tube members 12 of the exit board 7a and to abut the second, free ends 12b of each of the respective tube members 12 of the exit board 7b of the adjacent stack 3b. The back ball 9 may be sandwiched between the exit board 7a and the exit board 7b. As can be seen in FIG. 6, in this example, the exit board 7b has the opposite orientation to the orientation of the exit board 7a. The back wall 9 closes the respective tube members 12 provided in the exit board 7b; and also closes the extended tubular cavities 16 formed by the stack of four boards 4 by closing the respective tube members 12 provided in the exit board 7a so that each of the extended tubular cavities 16 has only one respective opening defined by a respective hole 15 defined in the first surface 10 of the entry boards 6a and 6b (not shown) respectively. Alternatively, the stacks can comprise individual back walls or other items that close each tubular cavity 16.

The stacks 3a, 3b may further comprise holes 20 defined in the first surface 10 of each board 4 for screws 17 that go through the stacks 3a, 3b and are screwed in a bolt 18 on the entry board 6. The hole/screw/bolt system is an attachment means that help maintaining sealed contact between the tube members 12 and groove 30 of the boards 4.

The stacks 3a, 3b further comprise a hole 19 for receiving a container with a starting population of bees.

In a further aspect of the present invention there is provided a method of forming 9 beehive for solitary bees and/or wasps (i.e. a method of forming the afore mentioned device (1)), the method comprising the steps of:

i) Providing a plurality of boards (4) according to claim 1;

ii) Stacking the plurality of boards by arranging at least a first board (4) so that the second, free ends 12b of the respective tube members (12) of the first board (4) abut the first surface (10) of a second, adjacent, board (4), so that the respective tube members (12) of the first board (4) are aligned with the holes (15) defined in the first surface (10) of the second, adjacent, board (4), such that the tubes of the first and second boards form extended tubular cavities (16).

In an embodiment the first surface (10) of each of the plurality of boards (4), around each of the respective holes 15 there may be defined a respective grove 30, and the step of stacking the plurality of boards by arranging at least a first board (4) so that the second, free ends 12b of the respective tube members (12) of the first board (4) abut the first surface (10) of a second, adjacent, board (4), may comprise stacking the plurality of boards by arranging at least a first board (4) so that the second, free ends 12b of the respective tube members (12) of the first board (4) abuts respective groves 30 defined in the first surface (10) of the second board.

In an embodiment a first board in the stack defines an entry board (6) and a last board in the stack defines an exit board (7) and wherein the method further comprises the step of arranging a back wall (9) to abut the second, free ends 12b of the respective tube members (12) of the exit board (7) so that the back wall (9) closes one end of the tubular cavities (16), and each respective tubular cavity (16) has a single opening only defined by a respective hole (15) defined in the first surface (10) of the entry board (6).

In an embodiment an attachment means (17,18) is used to maintain the boards (4) which form the stack (3a;3b) in abutment.

In an embodiment the method further comprises the step of orientating the stack (3a, b) such that the tubular cavities (16) extend in a direction which is parallel to the direction of gravity. In other words the stack (3a, b) is vertically laminated stack so that the first surface (10) and the second surface (11) of the boards of the stacks (3a, b) are arranged to extend in a direction following to the direction of gravity.

In yet a further embodiment the method further comprises the step orientating the stack (3a, b) such that the tubular cavities (16) extend in a direction which is perpendicular to the direction of gravity. In other words the stack (3a, b) is a horizontally laminated stack so that the first surface (10) and the second surface (11) of the boards of the stacks (3a, b) are arranged to extend in a direction perpendicular to the direction of gravity.

Various modifications and variations to the described embodiments of the invention will be apparent to those skilled in the art without departing from the scope of the invention as defined in the appended claims. Although the invention has been described in connection with specific preferred embodiments, it should be understood that the invention as claimed should not be unduly limited to such specific embodiment. For example:

In should be understood that the board (4) of the present invention is preferably composed of one or more of the materials chosen among plastic polymers; such as, for example, PVC or a polypropylene derivative, such as for instance Moplen.

It should also be noted that board (4) of the present invention is reusable; for example if a board is used in a beehive for a period of time, that same board may be reused in another beehive for another period of time.

Preferably the board (4) of the present invention is formed by die casting. For example, at least one board (4) of the stack (3a;3b) is die casted.

REFERENCES

1 Device according to a first embodiment
2 Housing
3a,3b Stack
4 Board
5 Opening of the housing
6a,b Entry board
7a,b Exit board
8 Intermediate board
9 Back wall
10 First surface
11 Second surface
12 Tubular members
14 Flange
15 hole
16 Tubular cavity
17 Screw
18 Bolt
19 Hole for container
20 Hole for screw
30 groove
35 stabilization member
12a First end of tubular member
12b Second, opposite, end of tubular member

What is claimed is:

1. A board which can be used to form a beehive for solitary bees and/or wasps, the board comprising a first surface and a second surface which is opposite to the first surface;
wherein the first surface having a plurality of holes defined therein;
wherein the board further comprises a plurality of individual tube members which project from the second surface and wherein each tube member is aligned with a respective hole defined in the first surface so that a bee can pass via a hole into the tube member which is aligned with said hole; and
wherein the plurality of tube members are arranged such that there are voids between adjacent tube members.

2. The board according to claim 1 wherein, in the first surface of the board, around each of the respective holes there is defined a respective groove, and wherein each respective groove is configured such that it can receive the second, free end of a respective tube member of another board.

3. A device for the nesting of solitary bees and wasps, the device comprising a plurality of tubular cavities arranged for being used by said solitary bees and wasps to build their nests in the nesting cavities for receiving offspring during the nesting period of said solitary bees or wasps, characterized in that the device comprises a stack formed by a plurality of boards according to claim 1, said stacks comprising at least an entry board and an exit board, the stack comprising at least a first board which is arranged so that the second, free ends of the respective tube members of the first board abut the first surface of a second, adjacent, board, so that the respective tube members of the first board are aligned with the holes defined in the first surface of a second, adjacent, board, such that the tubes of the first and second boards form extended tubular cavities which extend from the entry board to the exit board.

4. The device according to claim 3 wherein the first board is arranged so that the second, free ends of the respective tube members of the first board abut respective grooves defined in the first surface of a second, adjacent, board.

5. The device according to claim 3, wherein the stack further comprises a back wall which is arranged to abut the second, free ends of the respective tube members of the exit board so that the back wall closes one end of the tubular cavities, and each respective tubular cavity has a single opening only defined by a respective hole defined in the first surface of the entry board.

6. The device according to claim 3, wherein the holes defined in the first surface of each board are distributed homogenously on the board.

7. The device according to claim 3, wherein the stack further comprises at least one intermediary board between the entry board and the exit board.

8. The device according to claim 3, wherein the device further comprises attachment means to maintain the boards in the stack in abutment.

9. A method of forming a device according to claim 3, the method comprising the steps of:
providing a plurality of boards each of which can be used to form a beehive for solitary bees and/or wasps, each board comprising a first surface and a second surface which is opposite to the first surface; wherein the first surface having a plurality of holes defined therein; wherein the board further comprises a plurality of individual tube members which project from the second surface and wherein each tube member is aligned with a respective hole defined in the first surface so that a bee can pass via a hole into the tube member which is aligned with said hole; and wherein the plurality of tube members are arranged such that there are voids between adjacent tube members; and
stacking the plurality of boards by arranging at least a first board so that the second, free ends of the respective tube members of the first board abut the first surface of a second, adjacent, board, so that the respective tube members of the first board are aligned with the holes defined in the first surface of the second, adjacent, board, such that the tubes of the first and second boards form extended tubular cavities.

10. The method according to claim 9, wherein, in the first surface of each of the plurality of boards, around each of the respective holes there is defined a respective groove, and wherein the step of stacking the plurality of boards by arranging at least a first board so that the second, free ends of the respective tube members of the first board abut the first surface of a second, adjacent, board, comprises stacking the plurality of boards by arranging at least a first board so that the second, free ends of the respective tube members of the first board abuts respective grooves defined in the first surface of the second board.

11. The method according to claim 9, wherein a first board in the stack defines an entry board and a last board in the stack defines an exit board and wherein the method further comprises the step of arranging a back wall to abut the second, free ends of the respective tube members of the exit board so that the back wall closes one end of the tubular cavities, and each respective tubular cavity has a single opening only defined by a respective hole defined in the first surface of the entry board.

12. The method according to claim 9, further comprising, using an attachment means to maintain the boards which form the stack in abutment.

13. The method according to claim 9, further comprising orientating the stack such that the tubular cavities extend in a direction which is parallel to the direction of gravity.

14. The method according to claim 9, further comprising orientating the stack such that the tubular cavities extend in a direction which is perpendicular to the direction of gravity.

15. The board according to claim 1, wherein said voids between adjacent tube members define a network of air-channels configured to ventilate the beehive when the board is in use.

* * * * *